O. BRAUNWARTH.
TIRE TREAD.
APPLICATION FILED DEC. 29, 1916.

1,280,382.

Patented Oct. 1, 1918.

Otto Braunwarth, Inventor
By Ogden & Sheldon
his Attorneys

One of the United States Patent Office

OTTO BRAUNWARTH, OF NEW YORK, N. Y.

TIRE-TREAD.

1,280,382.

Specification of Letters Patent.

Patented Oct. 1, 1918.

Application filed December 29, 1916. Serial No. 139,665.

*To all whom it may concern:*

Be it known that I, OTTO BRAUNWARTH, a citizen of the United States, and a resident of the borough of Bronx, county of Bronx, city and State of New York, have invented certain new and useful Improvements in Tire-Treads, of which the following is a specification, accompanied by drawings.

This invention relates to tire treads, but more particularly to non-skid treads for pneumatic and similar tires, especially applicable to motor vehicles.

The objects of my invention are to improve upon that type of tire having a broken surface, which may be termed the obstruction tread, because the protuberances or projecting portions of suitable form provided upon such a tread afford obstructions to slipping and prevent skidding. My improvement contemplates all the advantages of the broken or obstruction tread, but in addition combines therewith the functions of the suction cup tread. I do not depend solely upon the broken form of the tire tread for preventing skidding, but modify and enhance the non-skid action of the obstructions by superimposing thereon the function of the suction cups. This I prefer to do by incorporating the suction cups in the body of the projecting portions of the broken tread, so that said projecting portions or obstructions will prevent skidding, not only because of their form and construction, but also adhere to the roadway because of the suction produced by the cups. The two functions thus operate conjointly and interdependently, and each modifies the other. The non-skidding action of the projections on the roadway is increased and prolonged by the suction cups, and on the other hand the sucking action of the cups is increased by reason of the road-cleaning action of the ribs or projections. These functions and their coöperation will be apparent from the specification and the drawings showing the preferred form of the invention.

In the drawings, Figure 1 is a face view of the tire tread;

Figure 1:
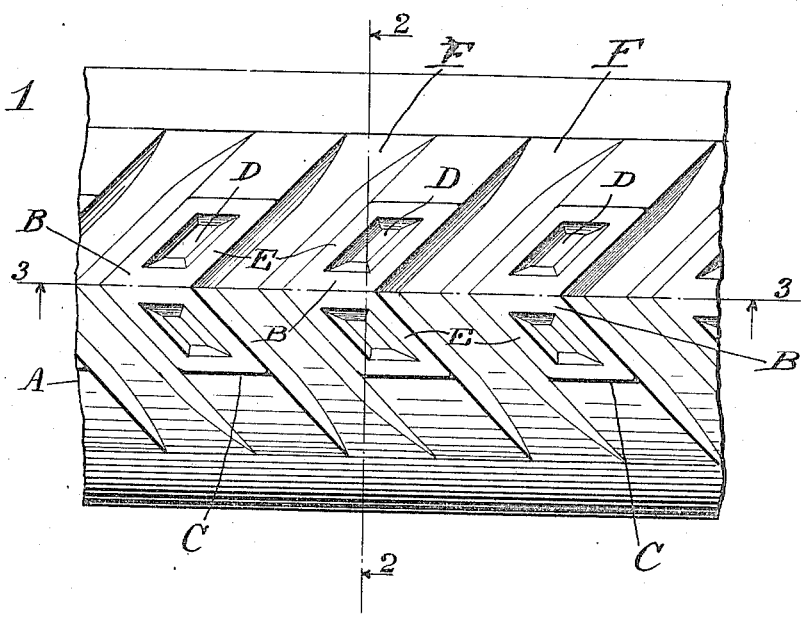
Figure 2:
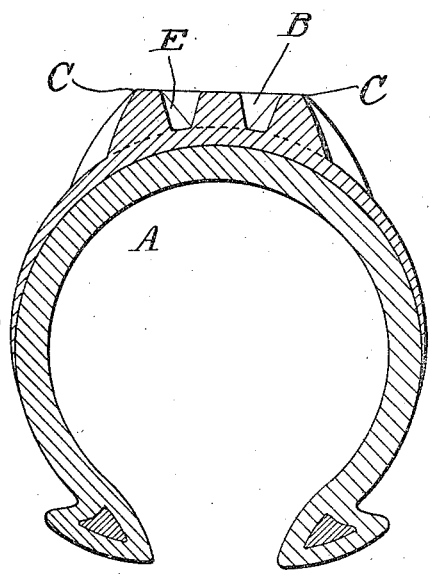
Fig. 2 is a cross section.
Figure 3:
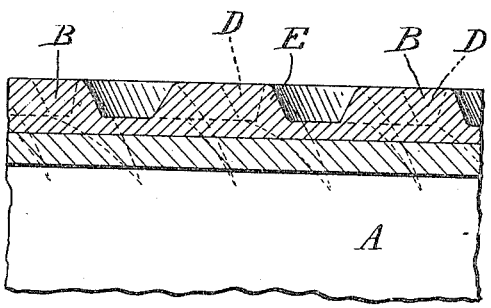
Fig. 3 is a longitudinal section of a portion of the tread on the line 3—3 of Fig. 1.

Referring to the drawings, A represents a shoe or cover, which may be of any suitable construction. The shoe is provided with ribs B inclined to the direction of travel of the tire and preferably of V shape. The heads or points of the V-shaped ribs preferably all extend in the same direction and lie centrally on the tread. These V-shaped ribs are also preferably provided with shoulders C at the sides, so that flat tread surfaces are formed on the ribs. The ribs are so formed that one rib contacts with the roadway before the next preceding rib leaves the roadway, thus insuring an even rolling contact with the road.

The V-shaped ribs are made so as to permit suction cups or recesses D to be formed in each rib. These cups or recesses preferably taper inwardly as shown in the drawings and are of such dimensions that the walls E of the cups are sufficiently thick to withstand the required wear and pressure. The ribs taper from the shoulders C and merge into the general contour of the tire tread at the sides.

I have thus devised a combined suction and obstruction or broken tread of special form. In the operation of the tread, the edges of each rib which are in contact with the roadway when the tendency to skid takes place, are at an angle to the direction of skidding and are thereby capable of scraping and cleaning the roadway on which scraped and cleaned surfaces the following surfaces of the ribs will hold. This is especially true in the case of a slippery asphalt pavement, for instance, and the edge or edges of the rib cut through the greasy surface dirt and plow off the dirt, leaving the cleaned road surface underneath. Since the ribs are provided with the suction cups or recesses D, these suction cups are enabled to exert increased suction on the previously cleaned road surfaces and thereby increase the action of the ribs in resisting skidding. The flat surfaces of the walls E of the recesses are thus enabled to contact directly with the cleaned surfaces of the roadway, because the dirt and grease has been plowed, scraped and cleaned off by the ribs, and greater suction is obtained than in those cases in which vacuum cups are provided on a tread, which does not have provision for plowing or cleaning the slippery roadway.

The suction cups or recesses are preferably tapered inwardly, because this increases the ability of the ribs to expel or get rid of dirt and other material which might accumulate in the suction cups. As the ribs are distorted or compressed under pressure, the walls of the cups bulge inwardly, as well as outwardly, and when the pressure is released as the wheel travels, the cups expand, thus expelling the dirt or other accumulated material and permitting it to fall out. The provision of the suction cups or recesses in the ribs also aids in keeping the depressions or spaces F between the ribs clean, because as the pressure on the ribs is released, these spaces assume their normal width and become wider, thus expelling the dirt and permitting it to drop out.

It is thus evident that I obtain all the advantages of the ribs, together with the advantages incident to the suction cups, but in addition, the plowing, cleaning and scraping action of the edges of the ribs, prepares the surface for the sucking action of the cups, which is thus increased beyond that obtainable with the cups alone formed in the surfaces of the tread or formed on knobs or projections which do not have the cleaning function of the V-shaped ribs. The ribs alone, without the suction cups, have a certain amount of non-skid action on the road surfaces, which has been found to be exceedingly efficient, but this non-skid action is greatly enhanced by the suction due to the suction cups, which grip and hold more securely on a cleaned or prepared surface than on the ordinary unprepared road surface. In the drawings I have shown two suction cups or recesses in each rib, one at each side of the center, but I am not to be understood as limiting the invention to any particular number of suction cups or recesses and obvious variations may be made in the shape of the ribs and suction cups, without departing from the scope of the claims. It is preferably desirable, as shown in the drawings, to incline the ribs at their sides away from the surface on which the tire may be resting, and in order that smooth rolling may be obtained, it is desirable that a portion of each rib at each side of the median or central plane of the tire be substantially the same distance from the center of the axle of the wheel on which the tire is used, as the center of the adjacent rib. This construction is obtained by providing the shoulders C on the ribs, at which points the ribs are thicker than at the center along the median plane of the tire.

I claim and desire to obtain by Letters Patent the following:

A tread for pneumatic and similar tires, formed with separate spaced ribs inclined to the direction of travel of the tire, said ribs having flat treads and shoulders at the sides so formed that a rib contacts with the roadway before the next preceding rib leaves the roadway, at least one edge of each rib which is in contact with the roadway when a skidding tendency takes place being at an angle to the direction of skidding and being thereby capable of scraping and cleaning the roadway on which cleaned surfaces the following tread surfaces of the ribs will hold, the ribs being formed with suction cups or recesses in their tread surfaces which are enabled to exert increased suction on the previously scraped or cleaned road surfaces and thereby increase the gripping action of the ribs in resisting skidding.

In testimony whereof I have signed this specification in the presence of two subscribing witnesses.

OTTO BRAUNWARTH.

Witnesses:
  ALBERT BRACHT.
  WILLIAM NETTJO.